US009760529B1

(12) United States Patent
Ho

(10) Patent No.: US 9,760,529 B1
(45) Date of Patent: Sep. 12, 2017

(54) DISTRIBUTED STATE MANAGER BOOTSTRAPPING

(71) Applicant: Amazon Technologies, Inc., Reno, NV (US)

(72) Inventor: Chi Hai Ho, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 325 days.

(21) Appl. No.: 14/489,451

(22) Filed: Sep. 17, 2014

(51) Int. Cl.
*G06F 15/177* (2006.01)
*H04L 12/24* (2006.01)
*H04L 29/08* (2006.01)
*H04L 12/911* (2013.01)
*H04L 9/00* (2006.01)
*G06F 11/20* (2006.01)
*G06F 17/30* (2006.01)
*H04L 12/26* (2006.01)

(52) U.S. Cl.
CPC ........ *G06F 15/177* (2013.01); *G06F 11/2025* (2013.01); *G06F 17/30575* (2013.01); *H04L 41/0813* (2013.01); *H04L 41/0893* (2013.01); *H04L 43/10* (2013.01); *H04L 67/2852* (2013.01)

(58) Field of Classification Search
CPC ..... H04L 41/12; H04L 67/10; H04L 41/0813; H04L 67/42; H04L 41/0893; H04L 43/08; H04L 43/10; G06F 15/177; G06F 15/173; G06F 3/065; G06F 17/30575; G06F 11/2025
USPC ....... 709/220, 223, 224, 222, 202, 218, 242, 709/209, 205
See application file for complete search history.

(56) References Cited

U.S. PATENT DOCUMENTS

| 4,665,520 A | 5/1987 | Strom et al. |
| 4,928,222 A | 5/1990 | Vriezen et al. |
| 5,212,788 A | 5/1993 | Lomet et al. |
| 5,261,085 A | 11/1993 | Lamport |
| 5,261,106 A | 11/1993 | Lentz et al. |
| 5,301,309 A | 4/1994 | Sugano |
| 5,522,029 A | 5/1996 | Hatfield |
| 5,553,239 A | 9/1996 | Heath et al. |
| 5,802,267 A | 9/1998 | Shirakihara et al. |

(Continued)

OTHER PUBLICATIONS

U.S. Appl. No. 14/670,238, filed Mar. 26, 2015, Carols Vara Callau et al.

(Continued)

*Primary Examiner* — Patrice Winder
*Assistant Examiner* — Abderrahmen Chouat
(74) *Attorney, Agent, or Firm* — Robert C. Kowert; Meyertons, Hood, Kivlin, Kowert & Goetzel, P.C.

(57) ABSTRACT

A particular node of a distributed state manager (DSM) detects a triggering condition for an initiation of a DSM initialization protocol. The particular node transmits a first bootstrap message to a second node of a proposed members list of a first proposed DSM configuration, comprising at least a joined members list and metadata indicative of state transitions for which processing of respective commit requests has been at least initiated at the particular node. In response to a determination that an initialization protocol for a particular DSM configuration indicated in a different bootstrap message received at the particular node has been completed, the particular nodes proposes itself as a coordinator of the particular DSM configuration based at least in part on an analysis of state transition metadata indicated in the different bootstrap message.

20 Claims, 10 Drawing Sheets

(56) References Cited

U.S. PATENT DOCUMENTS

| | | |
|---|---|---|
| 5,845,292 A | 12/1998 | Bohannon et al. |
| 5,923,832 A | 7/1999 | Shirakihara et al. |
| 6,078,930 A | 6/2000 | Lee et al. |
| 6,105,148 A | 8/2000 | Chung et al. |
| 6,169,991 B1 | 1/2001 | Tsukahara |
| 6,332,200 B1 | 12/2001 | Meth et al. |
| 6,374,243 B1 | 4/2002 | Kobayashi et al. |
| 6,516,350 B1 | 2/2003 | Lumelsky et al. |
| 6,529,933 B1 | 3/2003 | Montgomery et al. |
| 7,152,124 B1 | 12/2006 | Puri et al. |
| 7,249,280 B2 | 7/2007 | Lamport et al. |
| 7,426,653 B2 | 9/2008 | Hu et al. |
| 7,577,690 B2 | 8/2009 | Chandrasekaran et al. |
| 7,624,047 B1 | 11/2009 | Round |
| 7,773,522 B2 | 8/2010 | Chafle et al. |
| 7,783,610 B2 | 8/2010 | Lin et al. |
| 7,792,980 B2 | 9/2010 | Eshel et al. |
| 7,925,782 B2 | 4/2011 | Sivasubramanian et al. |
| 7,937,616 B2 | 5/2011 | Armstrong et al. |
| 7,984,439 B2 | 7/2011 | Mcconnell |
| 8,006,124 B2 | 8/2011 | Park et al. |
| 8,037,186 B2 | 10/2011 | Dumitriu et al. |
| 8,042,102 B2 | 10/2011 | Dewitt, Jr. et al. |
| 8,046,763 B1 | 10/2011 | Czajkowski et al. |
| 8,073,941 B2 | 12/2011 | Binyamin |
| 8,108,712 B1 | 1/2012 | Carlino et al. |
| 8,108,733 B2 | 1/2012 | Richmond |
| 8,122,098 B1 | 2/2012 | Richardson et al. |
| 8,271,437 B2 | 9/2012 | Arcese et al. |
| 8,321,568 B2 | 11/2012 | Sivasubramanian et al. |
| 8,654,650 B1 | 2/2014 | Vermeulen et al. |
| 2001/0033555 A1 | 10/2001 | Kim et al. |
| 2005/0028160 A1 | 2/2005 | Cofer et al. |
| 2006/0136781 A1 | 6/2006 | Lamport |
| 2006/0179059 A1 | 8/2006 | Reed et al. |
| 2007/0174541 A1 | 7/2007 | Chandrasekaran et al. |
| 2008/0177830 A1 | 7/2008 | Vo et al. |
| 2008/0208938 A1 | 8/2008 | Lin et al. |
| 2009/0177914 A1 | 7/2009 | Winchell |
| 2009/0287720 A1 | 11/2009 | Herter et al. |
| 2009/0327807 A1 | 12/2009 | Varadarajan et al. |
| 2010/0023521 A1 | 1/2010 | Arcese et al. |
| 2010/0161573 A1 | 6/2010 | Chan et al. |
| 2011/0106778 A1 | 5/2011 | Chan et al. |

OTHER PUBLICATIONS

U.S. Appl. No. 13/528,301, filed Jun. 20, 2012, Long X. Nguyen.
"Future (Java 2 Platform SE 5.0)," 2004/2010 Oracle and/or its Affiliates, downloaded from docs.oracle.com/javase/1.5.0/docs/api/java/util/concurrent/Future.html, pp. 1-4.
U.S. Appl. No. 13/528,271, filed Jun. 20, 2012, Long X. Nguyen.
U.S. Appl. No. 13/528,249, filed Jun. 20, 2012, Long X. Nguyen, et al.
U.S. Appl. No. 131528,340, filed Jun. 20, 2012, Long X. Nguyen.
U.S. Appl. No. 12/771,840, filed Apr. 30, 2010, Allan H. Vermeulen, et al.
U.S. Appl. No. 121887,042, filed Sep. 21, 2010, Allan H. Vermeulen, et al.
U.S. Appl. No. 12/771,851, filed Apr. 30, 2010, Allan H. Vermeulen, et al.
"Restoring Consistent Global States of Distributed Computations," Goldberg, et al., 1991 ACM, pp. 1-11.
"The Chubby lock service for loosely-coupled distributed systems," Mike Burrows, Google, Inc., pp. 335-350 Year of Publication: 2006, ISBN:1-931971-47-1.
"Transparent Checkpoint-Restart of Distributed Applications on Commodity Clusters," Laaden, et al., Appears in Proceedings of the 2005 IEEE International Conference on Cluster Computing (Cluster 2005), Boston, MA, Sep. 26-30, 2005.
"Distributed Checkpointing: Analysis and Benchmarks," Gustavo M. D. Vieira and Luiz E. Buzato, Partially supported by CAPES under grant No. 01P-15081/1997, pp. 1-16.
"Paxos Made Live—An Engineering Perspective," Chandra, et al., Jun. 20, 2007, pp. 1-16.
"Paxos Made Simple," Leslie Lamport, Nov. 1, 2001., pp. 1-14.
U.S. Appl. No. 13/869,902, filed Apr. 24, 2013, Long Xuan Nguyen.
U.S. Appl. No. 13/625,506, filed Sep. 24,2012, Nirmal Mehta, et al.
U.S. Appl. No. 13/770,569, filed Feb. 19, 2013, Bryan James Donlan.

DISTRIBUTED STATE MANAGER BOOTSTRAPPING

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling in order to meet demand, many computing-related services are implemented as distributed applications, each application being executed on a number of computer hardware servers. For example, a number of different software processes executing on different computer systems may operate cooperatively to implement the computing service. When more service capacity is needed, additional hardware or software resources may be deployed.

However, implementing distributed applications may present its own set of challenges. For example, in a geographically distributed system, it is possible that different segments of the system might become communicatively isolated from one another, e.g., due to a failure of network communications between sites. As a consequence, the isolated segments may not be able to coordinate with one another. If care is not taken in such circumstances, inconsistent system behavior might result (e.g., if the isolated segments both attempt to modify data to which access is normally coordinated using some type of concurrency control mechanism). The larger the distributed system, the more difficult it may be to coordinate the actions of various actors within the system (e.g., owing to the difficulty of ensuring that many different actors that are potentially widely distributed have a consistent view of system state). For some distributed applications, a state management mechanism that is itself distributed may be set up to facilitate such coordination. Such a state management mechanism, which may be referred to as a distributed state manager (DSM), may comprise a number of physically distributed nodes. The managed distributed application may submit requests for state transitions to the DSM, and decisions as to whether to commit or reject the submitted transitions may be made by a group of nodes of the DSM in at least some cases. Representations of committed state transitions may be replicated at multiple nodes of the DSM in some implementations, e.g., to increase the availability and/or durability of state information of the managed applications.

Of course, as in any distributed system, the components of the DSM may themselves fail under various conditions. In an environment in which communication latencies between DSM nodes may vary substantially, which may be the case depending on the nature of the connectivity between the nodes, determining whether the DSM itself is in a healthy state may not be straightforward. For example, messages between DSM nodes may be delayed due to a variety of causes, such as network usage spikes, DSM node CPU utilization spikes, or failures at the nodes or in the network, and verifying that a failure has indeed occurred may sometimes take a while. In some DSM implementations, manual intervention (e.g., based on alerts directed towards support staff when failure conditions are eventually detected) or other error-prone procedures may be required to recover from failures that affect multiple nodes.

Figure 1:
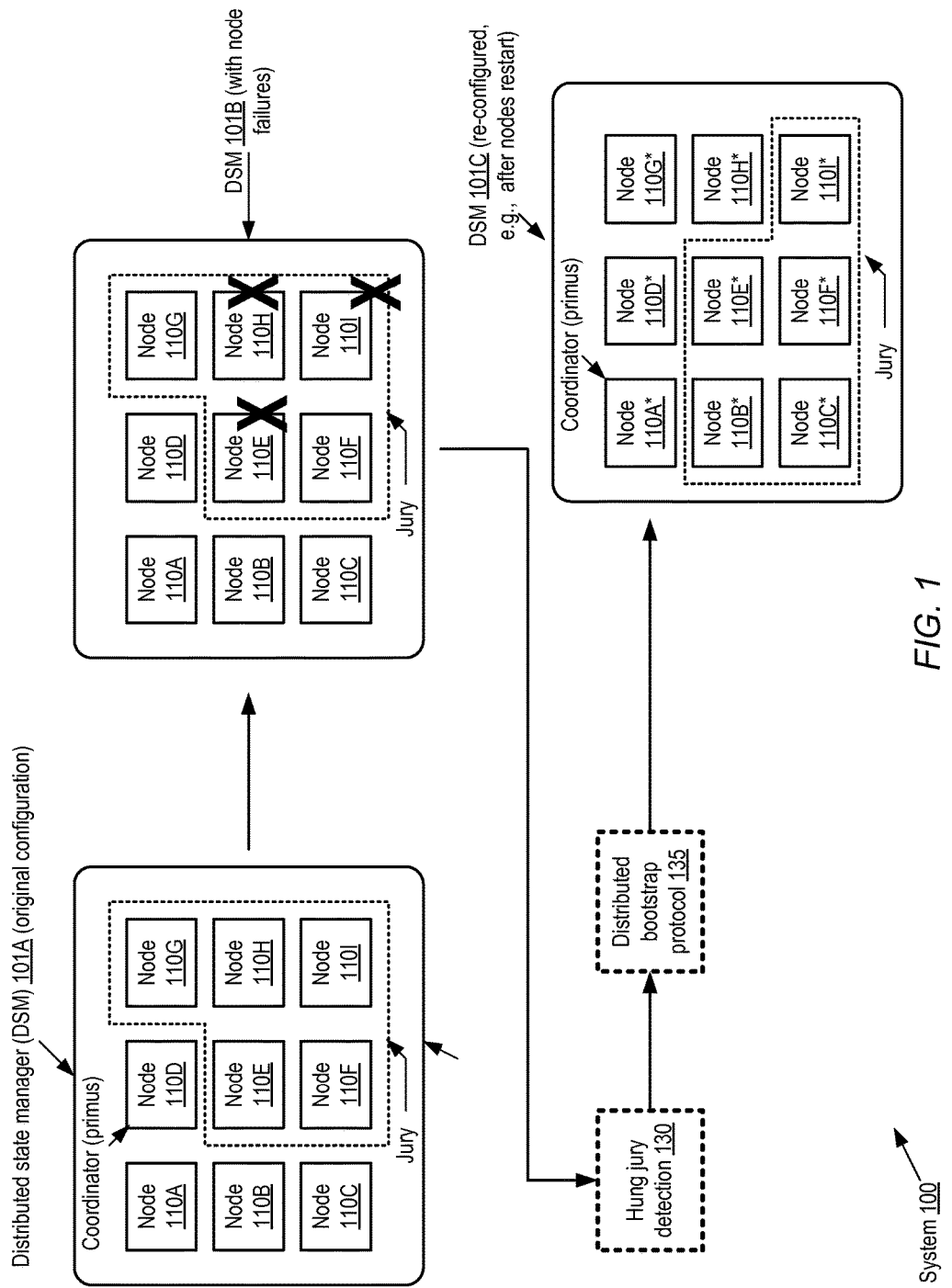
FIG. 1 illustrates an example system environment in which, in response to a detection of a triggering condition, a bootstrap protocol may be implemented by a plurality of nodes of a distributed state manager (DSM), according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for bootstrapping or initializing a configuration of a distributed state manager (DSM) comprising a plurality of network-linked nodes are described. DSMs may be established to manage state changes at distributed applications, e.g., in a provider network or "public cloud" environment in some embodiments. The distributed applications may comprise multiple concurrent and often autonomous processes, communicating with one another and/or with shared resources across one or more networks. Various application processes may be executing on different physical and/or logical (e.g., virtual) resources or platforms at any given time, and the number of resources involved in the application or service may change over time. In a distributed storage service, for example, processes (e.g., software servers) on different machines may each expose a programmatic interface to clients, which the clients may use to access a single, virtual file system that may be implemented across multiple storage resources. In order for the concurrent processes of a distributed application to cooperate successfully, it may sometimes be necessary for one or more of the processes to gain exclusive access to a given shared resource for a given period of execution. A distributed state manager may be used to manage accesses to such shared resources in some embodiments.

In one embodiment, the shared resource may include, for example, administrative/configuration information or data state information of the distributed application. In one example scenario, a distributed application may store group membership records in a shared repository, such as a respective record for each currently-running "worker" node of the application. If one or more worker nodes fail or lose communication with the other nodes, corrective action may need to be taken (such as adding replacement worker nodes, and/or initiating repair of the failed nodes). Initiating the corrective actions may itself be a distributed function—e.g., any of a number of monitoring nodes or processes may be able to initiate the corrective actions. To perform the corrective actions effectively (e.g., to avoid duplicating corrective actions), a consistent view of the group membership records may be required for the monitoring nodes. In addition to administrative information, application data for distributed applications may also require consistency mechanisms. For example, a given process may require exclusive read and/or write access to a shared file, database, database entry, variable, and/or various other shared data in order to perform a series of accesses to the shared data atomically with respect to the other concurrent processes of the distributed application.

To facilitate consistent sharing of administrative and/or data state among the multiple concurrent processes, the distributed application may employ the services of a DSM in some embodiments. The DSM may implement a repository or registry in which various types of state information of the distributed application may be stored. Each of the constituent processes of the distributed application may be deemed a client process of the DSM in some embodiments. The term "client" may be used synonymously with the term "client process" herein. Each client process may interact with the state manager to update various elements of the state information, and to coordinate access to state information shared with other constituent processes. In various embodiments, the repository may contain several types of elements, such as lockable data entries (i.e., software objects containing data values representing shared state information), session objects representing currently active interactions between the client processes and the DSM, locks and the like. To perform various access operations (e.g., reads, writes) to shared resources such as data entries and/or session elements of the registry, a client process may first acquire the shared resource's respective lock in some embodiments.

A DSM may provide various benefits over a non-distributed state manager, such as higher availability and/or throughput. For example, a DSM implemented on a cluster of computers may allow a client process to interact with any of a plurality of the computers in order to acquire and/or release locks. Thus, the DSM may be more resilient in case of a hardware and/or software malfunction. Additionally, a DSM may facilitate higher throughput of lock acquisition/release operations by utilizing collective resources from multiple machines. In addition to locking-related functions, a DSM may also provide a number of other types of functions in some embodiments, such as, for example, monitoring client application nodes, state information cache enablement, data transfers or replication, and the like. A number of different types of computing devices may be used singly or in combination to implement the nodes of a DSM in different embodiments, including general purpose or special purpose computer servers, storage devices, networking devices and the like. The repository in which state information is stored may be implemented using a number of different techniques in various embodiments, including for example as a logical or virtual object managed collectively by the nodes of the DSM. The set of nodes of a DSM may be referred to as a collective herein.

In at least some embodiments, a DSM may be used to manage one or more services of a provider network. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. A given provider network may include numerous data centers hosting various resource pools, such as collections of physical and/or virtualized computer servers, storage devices, networking equipment and the like, needed to implement, configure and distribute the infrastructure and services offered by the provider. At least some provider networks and the corresponding network-accessible services may be referred to as "public clouds" and "public cloud services" respectively. Within large provider networks, some data centers may be located in different cities, states or countries than others, and in some embodiments the resources allocated to a given service (such as a storage service or computing service whose state is managed using a DSM) may be distributed among several such locations to achieve desired levels of availability, fault-resilience and performance.

During normal operation, the nodes of a DSM may use various protocols (such as consensus-based protocols or quorum-based protocols in which a plurality of nodes collectively make decisions) to ensure that updates to state information from various client processes are managed appropriately, as described below in further detail. The set of DSM nodes that are configured to approve state transitions (which may also be described herein as write-containing transactions) may be termed a "jury" in some embodiments, and jury decisions may be coordinated and/or scheduled by a coordinator node of the DSM. The coordinator node may be termed the "primus" in some implementations. For example, in one implementation, a particular DSM may comprise nine nodes (e.g., nine processes instantiated at respective hosts), with five of the nodes designated as jurors with respect to a given distributed application being managed by the DSM. A client's state transition request may be received at any of the nine nodes, and may be transmitted to the coordinator by the receiving node (that is, if the state transition request as not received by the coordinator itself). The coordinator may in turn insert the requested transition in a queue for the jury's consideration. Unless a majority of the jury (e.g., at least three of the five jurors in the current example) agrees to commit the transition, the transition may be rejected in at least some embodiments. Representations of committed state changes may be replicated at some number of storage devices to ensure durability of state information.

As with any other distributed system, one or more nodes of a DSM may fail from time to time. Depending on the severity of the failure (i.e., how many of the nodes fail, and which specific nodes fail) and the size of the jury, the non-failed nodes of the DSM may respond in different ways in various embodiments. If the number of DSM nodes that fail is such that jury decisions can still be reached, the DSM may continue to function normally (or close to normally, with slightly longer delays in reaching commit/abort decisions than would be experienced in the absence of the failures), e.g., until the failed nodes restart and eventually rejoin. Thus, for example, with a five-node jury, a failure of up to two nodes may be tolerated for at least some periods of time. If, in the five juror scenario, three or more jurors fail, jury decisions may no longer be reachable. Such scenarios, in which jury decisions become unreachable due to failures or unresponsiveness of some subset of the jury, while at least one node of the DSM remains active, may be termed "hung jury" scenarios herein. In some embodiments, DSM nodes may be assigned identifiers that include process instantiation or incarnation information to help detect hung jury situations as described below in further detail.

According to some embodiments, the detection of a hung jury may lead to the rollout of a distributed bootstrapping protocol for the DSM, in accordance with which bootstrap messages are propagated among at least a subset of the DSM nodes until agreement on a new configuration is reached. The protocol may be considered distributed in the sense that, as described below, bootstrap messages may be generated at and transmitted from various nodes asynchronously (and potentially in parallel) with respect to the other nodes. In one example implementation, after a sufficient number of jury members to cause a hung jury have failed and been restarted, a different DSM node (e.g., one that has not failed) may determine that the jury was hung. This different DSM node may restart itself to enable a clean startup, try to rejoin the jury, determine that jury membership is not being decided promptly enough, and then initiate the propagation of bootstrap messages in accordance with the protocol. Alternatively, one of the nodes whose failure led to the hung jury may itself initiate the bootstrapping protocol after the node restarts and determines that jury membership decisions are not being completed in the normally-expected time frame. During the (typically short) interval that the DSM nodes participate in the bootstrapping protocol, normal operations (e.g., handling of client state transition requests) may be suspended in at least some embodiments; the normal operations may be resumed after the DSM has successfully completed bootstrapping. After a proposed DSM member set is agreed upon via the bootstrapping mechanism, one of the nodes of the set may be chosen as a coordinator or primus for managing client application state; however, the bootstrapping protocol itself may not require centralized coordination in at least some embodiments. The bootstrapping protocol may also be referred to herein as an initialization protocol for the DSM.

A number of other triggering conditions (i.e., other than hung jury detection) may also lead to the implementation of the bootstrapping protocol in at least some embodiments. For example, in one embodiment, the bootstrapping mechanism may be used to build a DSM from scratch, e.g., when first setting up a new DSM cluster, or after a maintenance period in which all the nodes are taken offline. In another embodiment, the bootstrapping protocol may be used after a "total" failure in which all the nodes fail and are eventually restarted.

According to at least one embodiment, the bootstrapping protocol may be initiated at any of the nodes of the DSM (and may be initiated by several of the nodes in parallel based on when the nodes respectively detect the bootstrap triggering condition). A node that initiates the protocol may be termed an "initiator" node in the following description.

The initiator node may determine a proposed membership list for the to-be-established DSM configuration in some implementations. The proposed membership may be ascertained in any of several different ways in different embodiments—e.g., by obtaining, from an external configuration database maintained at the provider network at which the DSM is implemented, a complete list of the hosts at which the nodes of the DSM may be instantiated, and then selecting a subset of the complete list. The minimum number of nodes that are required as members of a proposed DSM configuration may differ in different embodiments, e.g., based on configurable jury sizes, application state data durability requirements, and the like. In at least some implementations in which each node of the DSM is instantiated as a process on a different host, the host names may serve as representations or proxies of the members in the proposed membership list.

After determining a proposed membership, the initiator node may generate a bootstrap message whose contents are to be propagated among the proposed members. The contents of the message may differ in various embodiments. In one embodiment, for example, the message may include any combination of the following: (a) an identifier of the proposed configuration, (b) the proposed members list (e.g., a list of hosts at which respective nodes are expected to be instantiated), (c) a joined members list (indicating those nodes that have agreed to join the proposed configuration, initially comprising just the initiator node), (d) a last-committed-transition identifier (LCTI) initially corresponding to the last committed transition (of the client application being managed by the DSM) that is known at the initiator, (e) a last-accepted-transition identifier (LATI) corresponding to the last state transition of the client application that is known to have been received by the DSM, and a list of overridden DSM configurations. Additional details about the various constituent elements of a bootstrap message are provided below.

The initiator node may select one of the other nodes of the proposed configuration (e.g., a node selected at random from the proposed members list) as a destination node for the bootstrap message, and transmit the message to the selected node. The selected destination may be instantiated at a different host than the initiator node in at least some implementations. The initiator node may then wait to receive bootstrap messages from other nodes. When the selected destination node receives the bootstrap message from the initiator node, it may take any of a variety of specific actions depending on whether it is already participating in a bootstrapping procedure for a different proposed DSM configuration (i.e., a configuration proposed by a different initiator that may have detected the same bootstrap-triggering condition). Details of a number of specific transitions of the bootstrapping protocol (i.e., the actions taken by nodes in response to receiving a bootstrap message) are provided below.

If, for example, the selected destination node has not yet seen a bootstrap message, the selected may add itself to the joined members list. The selected destination may generate a modified version of the bootstrap message with the updated joined members list, modify some of the state transition metadata (e.g., the LCTI and/or the LATI) based on locally known transition metadata if necessary, and (assuming the proposed members list has at least three members) transmit the modified version of the bootstrap message on to a third node of the proposed members list. Upon receiving the modified bootstrap message, the third node may perform similar operations as those that were performed by the recipient of the initiator's message. In general, as variants of any given bootstrap message are propagated among the proposed members list, more and more members may join the proposed configuration indicated in the message, until eventually a sufficient number have joined to enable the bootstrapping phase of operation to be completed.

After all the members of the proposed members list (or some target number less than the full membership of the proposed members list) have agreed to join the proposed configuration, one or more of the members of the configuration may propose themselves for the role of coordinator (or primus) in some embodiments. For example, in some embodiments, a particular node N1 may receive a bootstrap message indicating that the required number of proposed members has joined, and N1 may then propose itself as a coordinator candidate based on comparing the LATI and/or the LCTI in the received bootstrap message with local transition metadata previously stored at N1. The membership of the DSM may collectively elect the primus from among the candidates. In at least one embodiment, the members of the jury may then be selected or appointed, e.g., by the primus. The DSM may then be placed in normal mode, e.g., as a result of the primus sending directives or requests to each of the members to start accepting client state transition requests. Each of the nodes may then implement its role in the DSM (e.g., as a coordinator, juror or non-juror), typically for a substantial time period (e.g., weeks or months) until it becomes necessary to roll out the bootstrap protocol again. Similar bootstrap protocols may be used for other types of distributed computing services as well in which group membership may have to be re-established after certain types of failure conditions; that is, the use of the bootstrap mechanism described herein may not be limited just to state managers.

Example System Environment

FIG. 1 illustrates an example system environment in which, in response to a detection of a triggering condition, a bootstrap protocol may be implemented by a plurality of nodes of a distributed state manager (DSM), according to at least some embodiments. A number of different configurations of a DSM are shown, starting with an original or initial configuration 101A in which the DSM is operating in normal mode, e.g., managing state transitions of one or more distributed client applications. DSM configuration 101A comprises nine nodes 110A-110I. In the original configuration 101A, node 110D has been designated as the primus or coordinator of state transition management, and a jury of five nodes (110E, 110F, 110G, 110H and 110I) has been established to vote on commits/aborts of state transitions for at least one client application. In the depicted embodiment, each node of the DSM may be designated a "citizen" node that can receive state transition requests from clients, and selected citizens may be designated as jurors or as the primus. In some implementations, the jury may include the primus; that is, the primus need not necessarily be a non jury node. Thus, nodes may be granted some combination of three types of roles with respect to state management: primus, juror and (by default, whether the node has been granted one of the other two roles or not) citizen. Each of the nodes may be instantiated as a process (or some number of co-operating processes) on a respective hardware server of a provider network in some embodiments. An indication of the DSM membership and currently-designated roles of the different nodes may be stored in a separate, fault-tolerant DSM configuration repository in some embodiments, such that any of the nodes can retrieve the current configuration from the repository as needed. In some embodiments, an incarnation indicator or process instantiation indicator may be included in the identifier assigned to each node and stored in the repository—e.g., a node may be identified by the host on which it is instantiated, as well as the time at which at least one of the node's processes was launched. The set of nodes 110 of a DSM may be referred to as a "collective" in some embodiments.

Depending on the implementation, a DSM configuration may be able to continue processing state transitions as long as the number of active (i.e., up and running) jurors remains above a threshold. In the case of a five-member jury, for example, at least three jurors may need to remain active in some implementations. If three (or more) of the jurors fail, as shown by the "X" symbols on nodes 110E, 110H and 110I in configuration 101B of the DSM, one or more of the remaining jurors or the primus may determine that the jury is hung (as indicated by block 130). For example, consider a scenario in which each node is implemented as a respective process. The processes implementing nodes 110E, 110H and 110I may each exit prematurely (e.g., due to a rarely-encountered software defect, or due to some other condition such as a high workload bursts leading to an out-of-memory condition) and may be restarted.

Each restarted node may then send a request to rejoin the DSM to some other node: for example, restarted node 110E may send a join request message to node 110F, indicating that 110E would like to be re-added to the DSM. Node 110F, which may not yet be aware that three of the jurors had failed, may submit the join request for a majority decision by the jury. However, because a majority of the jury is not active, it may not be possible to approve 110E's join request. Using the process instantiation/start indicator in 110E's join request, 110F may be able to determine that the join request was from a different instance of 110E than existed in the earlier configuration 101A. Similarly, node 110F (or some other node) may receive join requests from nodes 110H and 110I. None of the join requests may succeed since the jury does not have a viable majority. Eventually, a timeout may expire at one or more of the nodes, e.g., indicating that the jury was hung and that a distributed bootstrap protocol 135 should be implemented to re-configure the DSM. It is noted that a respective implementation of the distributed bootstrap protocol may be begun at more than one initiator node (without any of the initiator nodes necessarily being aware that other nodes have also begun the protocol) in at least some embodiments. As described below in greater detail, a given implementation or instance of the bootstrap protocol may consist of a propagation of a proposed identifier and proposed membership for the re-configured DSM, a currently agreed-upon members list, and state transition metadata indicative of the most recent committed state transition known by the current members, and/or the most recent state transitions for which commit requests had been received but not yet fully processed. As each node receives a version of a bootstrap message containing such information, the node may determine (using logic described below) whether it should join the proposed DSM configuration indicated in the message or not, and may alter one or more components of the message to generate a new version to be forwarded on to other nodes.

The transition logic of the bootstrap protocol may ensure that eventually a stable re-configuration of the DSM is achieved, such as the configuration 101C shown in FIG. 1. The node identifiers (e.g., 110A*, 110B*, etc.) are shown with respective asterisks in configuration 101B to indicate that at least in some implementations, the corresponding processes may have been restarted since the previous normal-mode configuration 101A was set up. In other implementations, only the failed nodes (e.g., 110E, 110H and 110I) may be restarted, while the processes corresponding to the nodes that did not fail may continue without restarting. The new configuration may have a different primus (e.g., node 110D) than the configuration 101A that existed before the failures of nodes 110E, 110H and 110I, e.g., depending on which of the nodes had the most recent locally-stored state transition metadata, as described below. In some embodiments, the jury of the new configuration 101C may differ from the jury in the original configuration—e.g., a new jury shown in FIG. 1 comprises nodes 110B, 110C, 110E, 110F and 110I. It is noted that neither the primus nor the jury membership may change between pre-bootstrap configurations such as 101A and post-bootstrap configurations such as 101C in various embodiments. The process used for selection of the primus and/or the jury members may be independent of the bootstrap protocol 135 in some embodiments—e.g., the primary purpose of the bootstrap protocol may be to re-assemble some number of citizen nodes of the DSM, with the designation of the primus role and or the designation of juror roles being performed separately.

In some embodiments, in which for example some of the failures of configuration 101B may have been caused by hardware problems that cannot be resolved in a short-enough period, the re-configured DSM 101C may comprise a smaller number of nodes than the original configuration 101A. For example, a minimum of eight nodes may be required for a given DSM instead of the nine nodes shown in FIG. 1 in some cases. Similarly, the number of nodes in the post-bootstrap jury need not always match the number of nodes in the pre-bootstrap jury. The rules governing minimum memberships may differ for different DSMs—e.g., depending on the availability, performance or other requirements of the client applications being managed. As mentioned earlier, the bootstrap protocol 135 may be performed in response to other types of triggering conditions than hung jury detection in some embodiments—e.g., to start up a DSM for the first time, or to bring a DSM back online after a controlled shutdown (such as a shutdown of all the nodes for maintenance purposes) or after a failure of all the member nodes.

Figure 2:
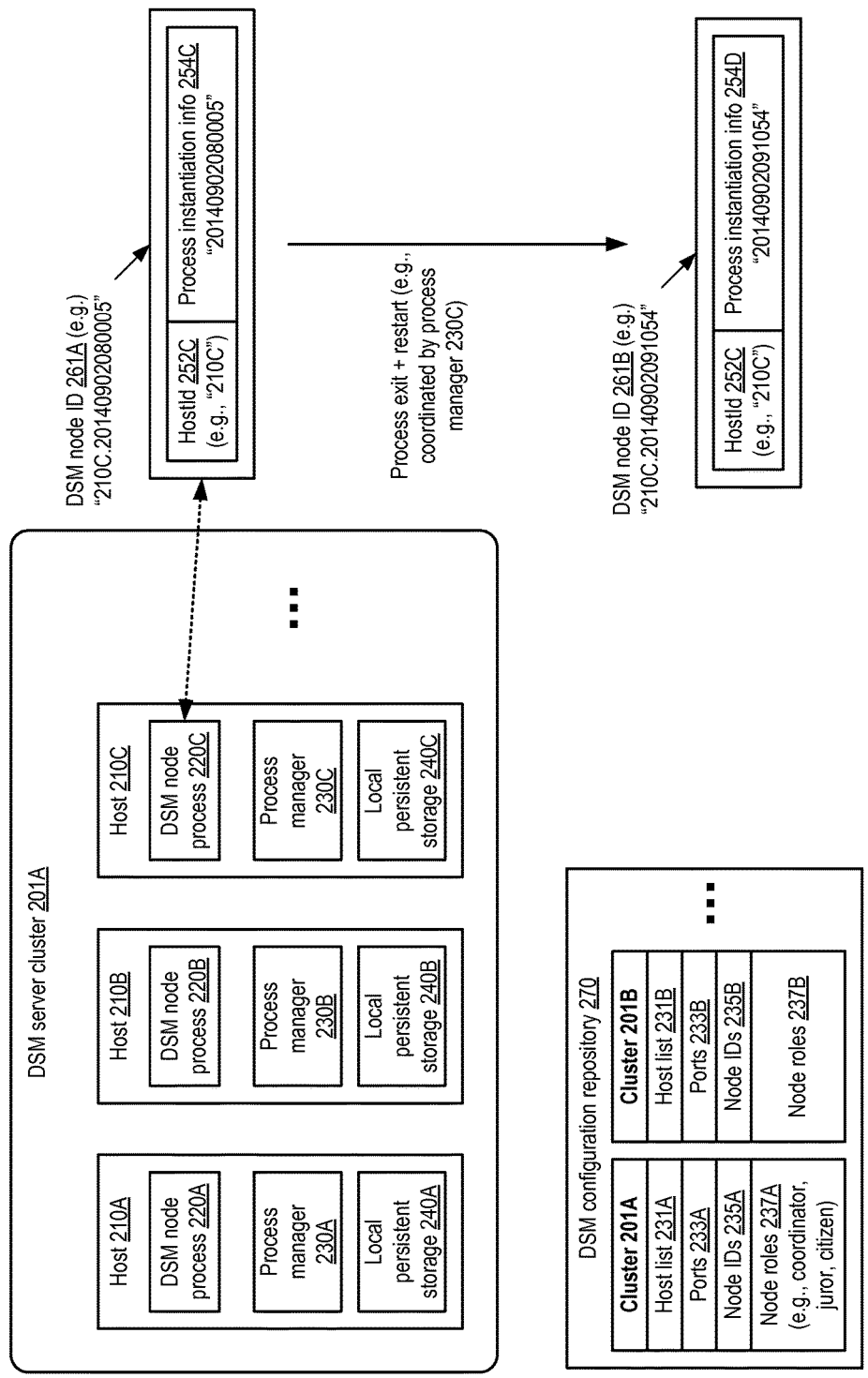
FIG. 2 illustrates an example scenario in which the nodes of a DSM are implemented as respective processes at respective hosts of a cluster, according to at least some embodiments.

FIG. 2 illustrates an example scenario in which the nodes of a DSM are implemented as respective processes at respective hosts of a cluster, according to at least some embodiments. As shown, a DSM server cluster 201A may comprise a plurality of hosts 210, such as host 210A, 210B, and 210C. Each host 210 may comprise a respective DSM node process 220, such as process 220A on host 210A, process 220B on host 210B, and process 220C on host 210C. In other embodiments, a DSM node may comprise a plurality of interacting and cooperating processes on a given host (or on several hosts). Each of the hosts 210 comprises respective local persistent storage 240 (e.g., comprising portions of one or more disk-based storage devices), such as storage 240A on host 210A, storage 240B on host 210B, and storage 240C on host 210C. The persistent storage at each of the nodes may be used to store a variety of objects, such as local copies of state information of the application(s) whose state is being manages by the DSM (e.g., commit-related and acceptance-related metadata) as well as parameters of the bootstrap protocol (e.g., an identifier of the proposed DSM configuration which the node is in the process of joining).

In the embodiment depicted in FIG. 2, each host 210 may comprise a process manager 230 (e.g., process managers 230A-230C at hosts 210A-210C respectively), responsible for monitoring the state of the local DSM node process 220 and starting a new instance of the node if the current instance fails. Each DSM node process 220 may be assigned an identifier comprising at least two elements in some embodiments: an identifier of the host at which the process is executed, and a process instantiation indicator or timestamp indicative of the launch or instantiation of the process. The instantiation indicator may also be referred to herein as the process incarnation indicator. Thus, for example, DSM node process 220C may be assigned node identifier 261A comprising the string 210C.20140902080005, with the one part 252C of the identifier ("210C" in this example) indicating the host, and another part 254C of the identifier ("20140902080005" in this example) indicating the instantiation or launch time of the process. If the 220C process exits and is restarted (e.g., by process manager 230C), a node identifier 261B with the same hosted component 252C and a different instantiation subcomponent 254D may be assigned to it. The formats in which host identifiers and instantiation information are encoded within node identifiers may differ in various embodiments; for example, IP addresses assigned to the hosts may be used instead of names, and a monotonically increasing logical counter value may be used for instantiation/incarnation identification. It is noted that in some embodiments the instantiation information may not necessarily correspond to timestamp values obtained from any particular logical or physical clock, although such timestamp values may be used in other embodiments.

The DSM nodes may include their identifiers in communications with other nodes, and the node identifiers of approved configurations (i.e., configurations whose membership and role assignments have been agreed upon by a valid jury) may also be stored in DSM configuration repository 270 that can be accessed from the DSM nodes as and when needed. For each DSM cluster in use at a provider network (e.g., cluster 201A, 201B etc.), the DSM configuration repository 270 may comprise a number of different configuration data elements, including a list of the hosts 231 (e.g., host list 231A of cluster 201A and host list 231B of cluster 201B), the network ports 233 (e.g., 233A or 233B) to be used to communicate with the nodes on each of the hosts, the node identifiers 235 (e.g., 235A or 235B) and the roles 237 (e.g., 237A or 237B) currently assigned to the nodes. In some embodiments, the node identifiers may comprise host identifiers 252 as well as instantiation information 254 as described above. Upon receiving a message sent from a node at a given host 210, the recipient (e.g., a different node at a different host) may be able to compare the sender's node identifier (included in the message) with the expected node identifier for the sender's host as indicated in the currently-approved configuration stored in repository 270 (or cached at the receiver node). If the two node identifiers differ (e.g., in their instantiation information), the recipient may be able to detect that the sender node is not part of the current approved configuration. Such detection may help identify hung juries and/or other unexpected DSM configuration states. It is noted that although in the example illustrated in FIG. 2, each host comprises one DSM node and each DSM node is instantiated on a different host, such a 1:1 mapping between hosts and DSM nodes may not be required in some embodiments.

Figure 3:
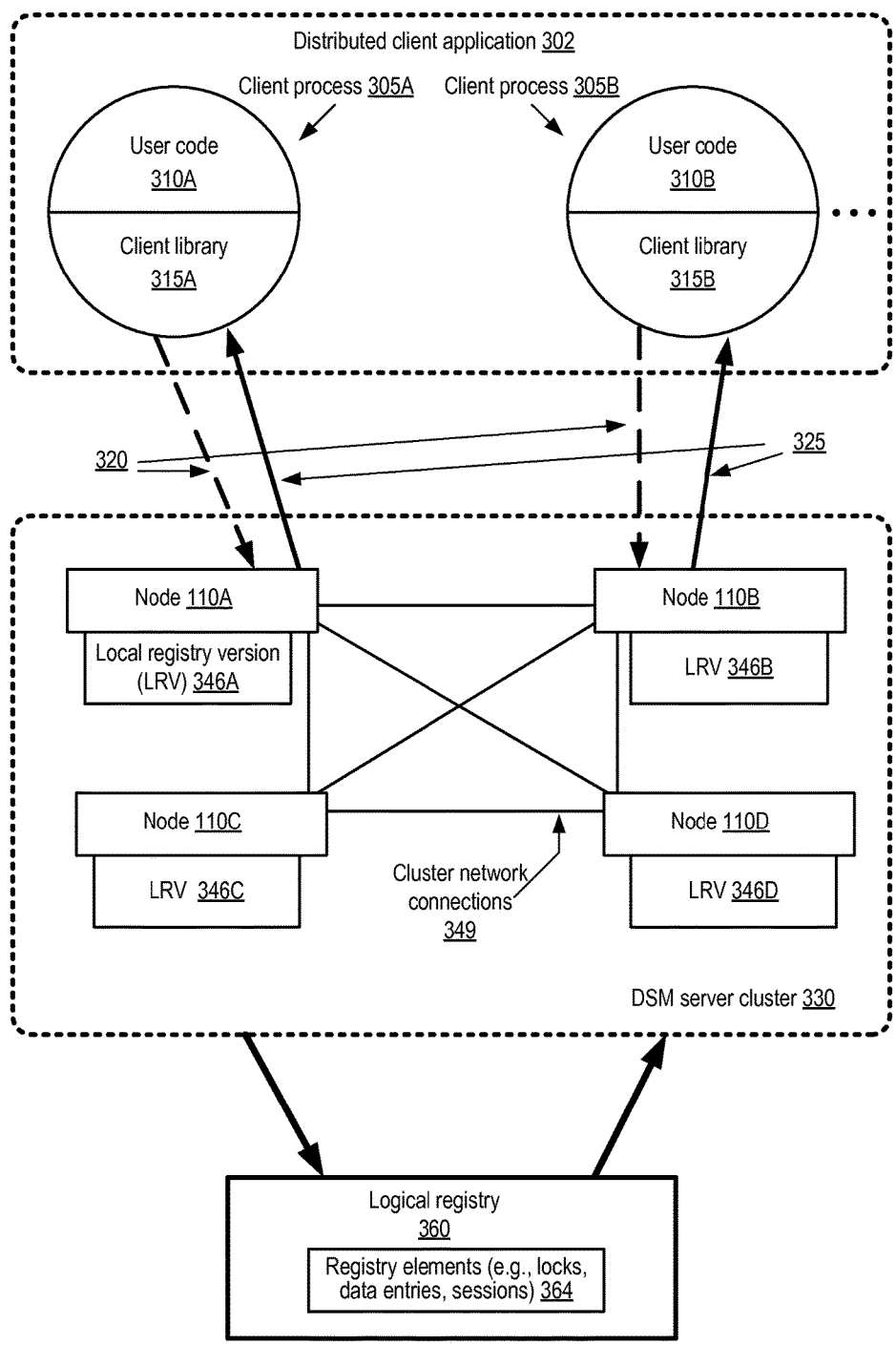
FIG. 3 illustrates an example of replication of state information at various nodes of a DSM managing a distributed client application, according to at least some embodiments.

As mentioned earlier, in many scenarios a DSM may be used to manage state information for a distributed client application—thus, both the application being managed, and the DSM itself, may each comprise a plurality of nodes. FIG. 3 illustrates an example of replication of state information at various nodes of a DSM managing a distributed client application, according to at least some embodiments. In the illustrated embodiment, the DSM server cluster 330 comprises plurality of nodes 110 (e.g., 110A, 110B, 110C and 110D). While DSM hosts are not illustrated in FIG. 3, at least some of the nodes may be instantiated at different hosts than others in some embodiments. Distributed client application 302 may comprise any program, or part of a program, that is configured to use a DSM for management of application state. Each distributed client application 302 may comprise a plurality of client processes 305 (e.g., 305A and 305B), each representing one or more threads of execution of the client application. For example, client processes 305 may represent respective nodes of a distributed storage service application that is configured to receive customer requests over a network and in response, perform various functions on behalf of those customers. In the illustrated embodiment, a client process 305 may comprise an execution of user code 310 and DSM client library components 315. Client process 305A executes user code 310A and client library components 315A, and client process 305B executes user code 310B and client library components 315B. Different client processes may execute different user code and/or library components in some embodiments. A client library component 315 of the DSM may in some embodiments comprise a software library that exposes one or more programmatic interfaces to user code 310 for interacting with the DSM server cluster 330.

A given client process 305 may communicate with the DSM via any one of the nodes 110 in the depicted embodiment. Different client processes may communicate with different nodes in some embodiments. The particular node 110 chosen by a client process 305 may depend on the identity of the client, the type of request, and/or other factors. In some embodiments, a client process 305 may maintain affinity to a given node 110 once communication and/or another relationship has been established. It may also be possible for a client process 305 that has established affinity with a first node 110 of the DSM to switch to another node at any time. This may be done arbitrarily, in response to a node failure, in response to the node becoming overloaded, in response to a scheduler component indicating that the client should switch to another node, and/or in response to various other events. As shown in the illustrated embodiment, the various nodes 110 may communicate with one another via cluster network connections 349. These network connections may be implemented using various types of networks (e.g., Myrinet, Ethernet, Gigabit Ethernet, etc.) in various topologies (e.g., ring, grid, Torus, bus, etc.). In some embodiments described herein, a DSM implemented on a fully-connected cluster of computers, where each node 110 is on a different physical machine in the cluster, executes a separate instance of the DSM node software, and can communicate directly with every other node 110 in the DSM configuration via a network connection. However, those skilled in the art will appreciate that various other configurations are possible using different physical and/or virtual machines, connected by different network types and/or topologies such as the topologies described above.

According to FIG. 3, nodes 110 of the DSM may work together to maintain state information, e.g., for various client applications, in a logical registry 360. The logical registry 360 may not necessarily be implemented as a separate physical entity, but rather, as a logical entity that may be implemented across multiple nodes 110 of the DSM. For example, in the depicted embodiment, each node 110 may keep a respective local registry version (LRV) 346 (e.g., LRV 346A at node 110A, LRV 346B at node 110B, and so on) comprising a portion or all of the contents of logical registry 360. Through a consensus protocol, the nodes 110 may agree on state transitions for each node to apply to its LRV 346, thereby collectively maintaining a single logical registry 360. Each node 110 may thus maintain a cached copy of the registry that is valid as of the last registry transition (i.e., update to state information) known at the node. In some embodiments, each transition may be associated with a registry logical timestamp, such as in a monotonically increasing 64-bit integer or counter agreed upon by the DSM jury. This timestamp may be a physical or logical time in different embodiments, and may be referred to as the "DSM time". In embodiments where the DSM time is maintained as a counter, it may be incremented each time the registry is updated in some implementations, e.g., each change to the logical registry may result in a change to the DSM time, and each change in the DSM time may indicate that at least one element of the registry was updated. In at least one embodiment, each node may keep track of at least two types of timing-related information pertaining to requested state transitions: the time at which a state transition was accepted for commit evaluation (i.e., for an eventual decision as to whether the transition is to be committed or aborted), and the time at which a state transition was committed/aborted at the logical repository. In some embodiments, each node 110 may maintain its own local registry timestamp, indicative of the most recent transition of the logical registry that is reflected in the local LRV at that node. At any point in time, in some implementations, the value of the local registry timestamp at a given node 110 may differ from the value of the local registry timestamp of another node; however, if and when two nodes have the same local registry timestamp values, the data in their respective LRVs 346 may be identical (i.e., both local LRVs may be guaranteed to have applied the same set of updates).

In some embodiments, the logical registry 360 may include several types of elements and associated metadata, such as lock objects, data entries, session objects representing connections to client processes 305, and the like. Some or all of the registry elements may be used to represent application state of the distributed client applications 302. In some embodiments, the DSM may maintain multiple logical registries. In such embodiments, each logical registry may be identified by a unique name. Different logical registries may be used to store data relevant to a corresponding client application or set of client applications in some embodiments. For example, different distributed applications may use respective logical registries separate from one another. In other embodiments, a single logical registry may include elements representing state information of a plurality of client applications. In some embodiments, each of the elements of a given registry 360 (such as locks, data entries, and/or sessions) may be identified by a respective pathname (e.g., "registry1:/companyA/departmentB/objectC" within a namespace, e.g., each element may be identified via a string concatenated from substrings, where each substring represents a respective hierarchical component named using a directory-like naming convention, starting with a root substring (e.g., "registry1:" in the case of the element with the identifier "registry1:/companyA/departmentB/objectC"). Each object managed using the logical registry 360 may be identified by a respective path in the registry namespace.

During normal operation (i.e., when not in bootstrap mode) the DSM server cluster 330 may act as a mediator between the client processes 305 and one or more logical registries 360. The client process 305 may interact with a logical registry 360 by submitting transactions 320 to the DSM server cluster 330, which may interact with the logical registry 360 on behalf of the client process. In some embodiments, requests to read state information may also be submitted as transaction requests—that is, a given transaction may comprise reads, writes, or reads and writes. Through a read transaction, a client process may read information such as locks, entries, or sessions from the logical registry 360. Using a write transaction, a client process 305 may update information in the logical registry 360. The DSM may determine the outcome of various transactions and route event notifications (e.g., as indicated by the arrows labeled 325 in FIG. 3) indicating the outcomes to interested client processes 305.

Figure 4:
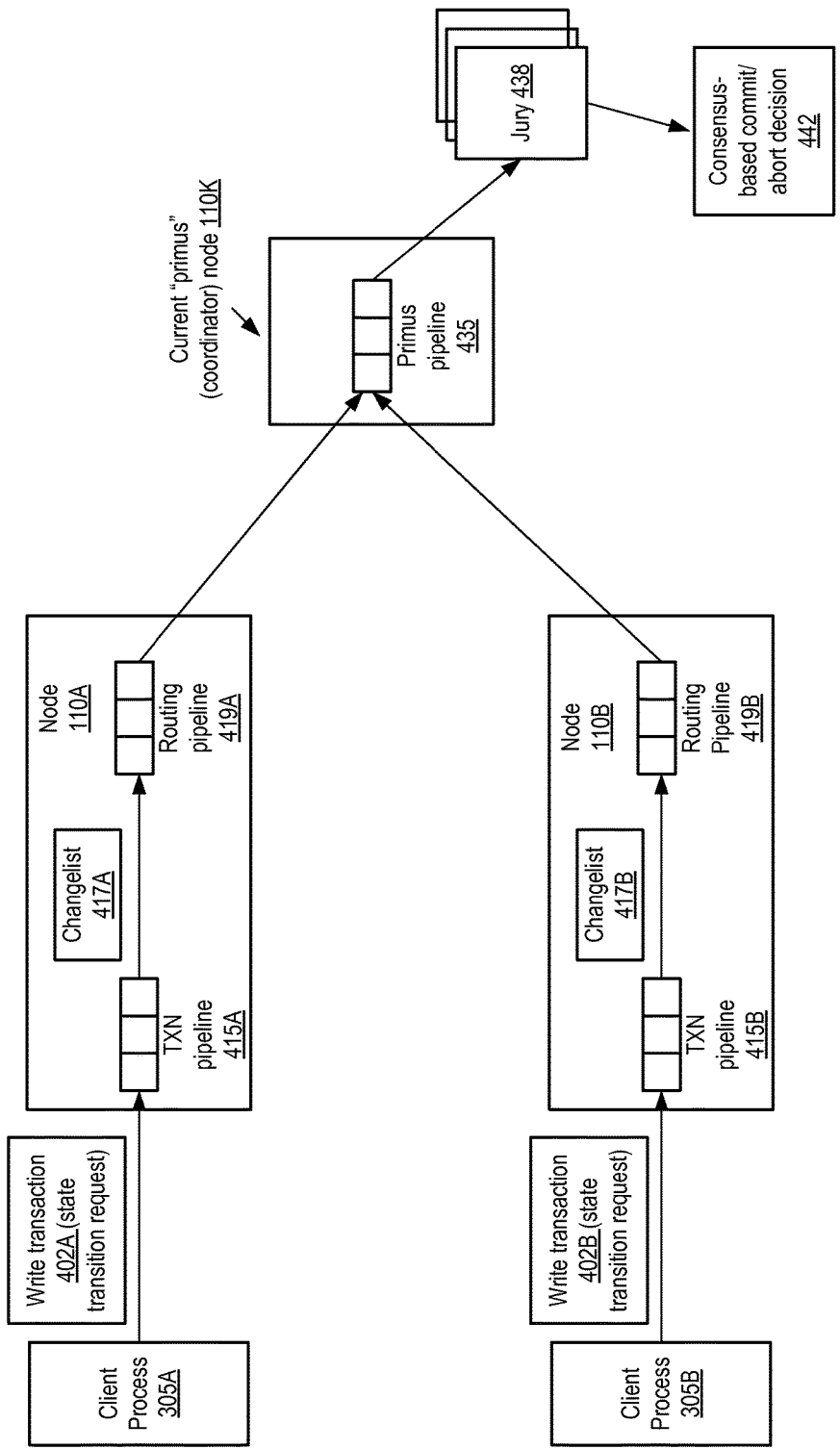
FIG. 4 illustrates example steps taken by a DSM to process modifying (write-containing) transactions, according to at least some embodiments.

FIG. 4 illustrates example steps taken by the DSM to process modifying (write-containing) transactions, according to at least some embodiments. In the illustrated embodiment, client process 305A generates a write transaction request 402A representing a requested state transition, which may comprise a list of operations (including at least one write, update, or delete operation) to be performed on data in the logical registry 360, and communicates it to a DSM node 110A. The transaction request 402A may be encoded using the client library 315A, and may be transmitted over any appropriate type of network connection. The transaction may be encoded using a stack-based transaction language in some embodiments. A different client process 305B may encode its own write transaction analogously, and transmit it in the form of write transaction request 402B to a node 110B of the DSM. In some embodiments, different client processes 305 may submit their transactions to the same node 110; the target node to which a transaction is sent may be determined using a number of different techniques in different embodiments.

The DSM node 110 that receives the transaction 402 may decode the transaction and insert it into a queue maintained for its transaction pipeline 415 (e.g., transaction pipeline 415A for node 110A, or transaction pipeline 415B for node 110B). In some embodiments, if the transaction happened to be read-only, the values of the various registry elements to be read may be obtained from the local LRV, and returned to the client, without any further interactions with the other nodes of the server cluster. Thus, the receiving DSM node 110 may commit read-only transactions independently of other nodes, and may assign a commit timestamp (e.g., the value of the local registry timestamp) to the transaction. In the illustrated example, however, each transaction comprises at least one write/update/delete operation. Because the transaction received via message 402A includes a modifying operation, a change list 417A may be constructed and populated for the transaction. In some embodiments, a stack-based representation of a change list may be used. For example, node 110A may first construct an empty stack representing an empty change list 417A and initiate a transaction processor. The processor may execute the operations of the transaction in sequence, popping each parameter from the stack, reading information from the LRV, and pushing results back to the stack. During this transaction-processing phase, the node may avoid writing directly to the registry, since the DSM jury 438 may have to agree upon changes to the registry. Instead, the node may write state changes into the change list 417A that it may submit to the jury later. The change list 417A may also include check operations to ensure, for example, that the context of the transaction remains as expected (e.g., to ensure that values of registry elements that are included in a read-set of the transaction have not been changed as a result of other modifying transactions). Similarly, a change list 417B may be constructed for client process 305B's transaction at node 110B.

In different instances, the transaction processing may terminate in different states. For example, the transaction processing may terminate in an error state, indicating that the transaction failed. Alternatively, the transaction processing may terminate in a failed state, indicating that a check failed (e.g., data in the read-set was modified). For modifying transactions, the transaction processing may complete in a pending state, indicating that the operations of the transaction were completed successfully, but the change list is not empty.

If the transaction processing completes in a pending state, then to complete the transaction, the DSM collectively must agree to modify the logical registry 360 according to the change list 417 in some embodiments. A given DSM node 110, such as 110A, may attempt to get the DSM to agree to commit the changes to the logical registry 360 by initiating a consensus protocol. The node 110 may initiate the consensus protocol by sending the change list 417 to the DSM node in the collective that has been predetermined as the leader or primus. In the illustrated embodiment, a node 110K is designated as the current coordinator or "primus" node, and the change list 417A may be placed in a routing pipeline 419A for transmission to the primus node 110K. Similarly, change list 417B may be placed in a routing pipeline 419B for transmission to the primus node 110K. The primus node 110K may have its own pipeline 435 in which change lists from various other nodes 110 are queued and processed. The primus may then propose the changes in a given change list 417 to other nodes of the DSM via a consensus protocol, such as a protocol similar to Paxos. In some embodiments, the primus may propose the change to members of jury 438. Once the DSM (e.g., either all the nodes 110, or a subset of the nodes that forms the jury) decides on whether to make the change(s) of a change list to the logical registry 360 (e.g., when a consensus-based commit or abort decision 442 is reached), the primus may notify the particular node 110 from which the change list was received of the outcome. In other embodiments, the node 110 that sent the change list 417 may discover the result by reading its updated copy of the registry rather than by receiving an explicit indication from the primus node. The node 110 may then return one or more results of the transaction to the corresponding client process 305, and may indicate the commit time of the transaction (e.g., the DSM time when the transaction's changes were committed to the logical registry). In some embodiments the transaction results may also be encoded using a stack-based representation, and decoded by the client library component 315 of the client process. In at least some embodiments, in the event a given transaction does not get committed, the transaction may be retried, either by the receiving node 110 (the node that received the transaction message 402 from the client process 305) or by the client process 305 resubmitting the transaction. Different retry policies may be in effect in different embodiments, governing for example if, when, and by which entities transactions are to be re-attempted.

Figure 5:
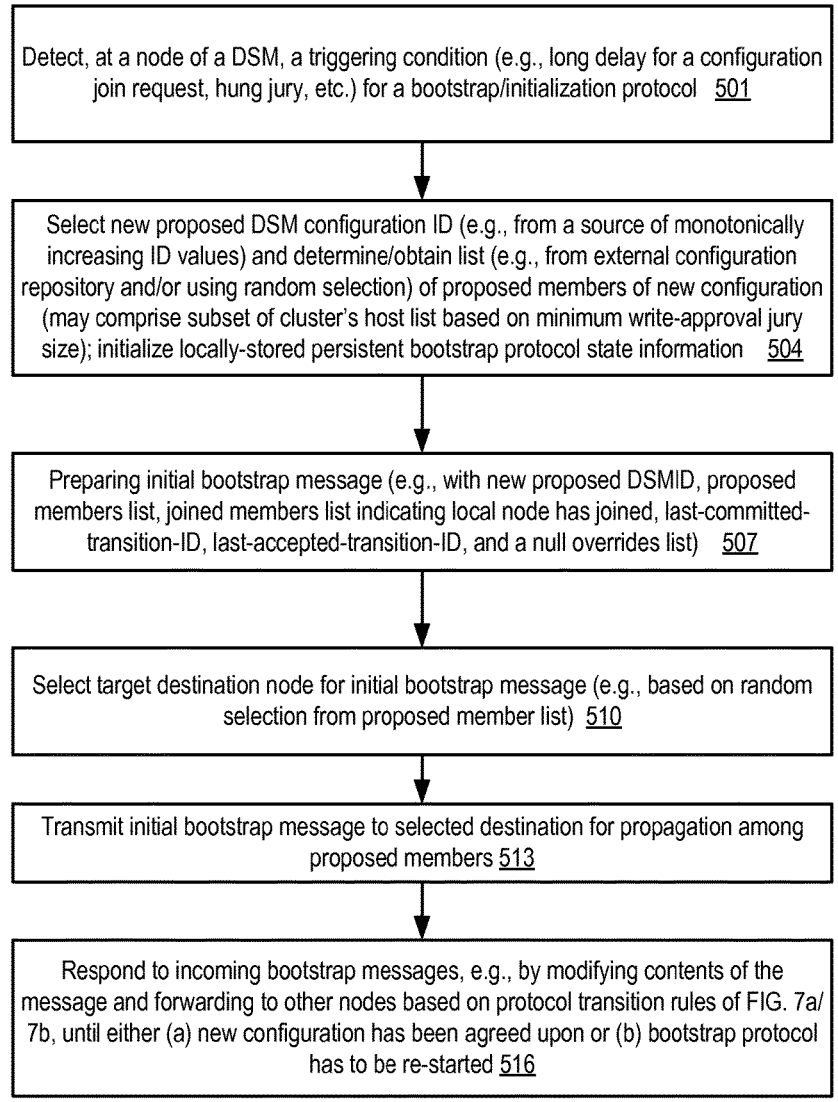
FIG. 5 is a flow diagram illustrating aspects of a DSM bootstrap protocol, according to at least some embodiments.

FIG. 3 and FIG. 4 illustrate normal-mode operations of a DSM, which may be performed when at least a majority of the jurors are up and running Under certain conditions (such as failures of a majority of jurors as illustrated in FIG. 1), the DSM may have to suspend normal-mode operations and be re-configured. FIG. 5 is a flow diagram illustrating aspects of a DSM bootstrap protocol that may be used for such a re-configuration, according to at least some embodiments. As shown in element 501, a triggering condition for bootstrapping a DSM may be detected at a particular node of the DSM, which may be termed the initiator node of the protocol. For example, the occurrence of a hung jury may be detected (e.g., as a result of receiving messages from several re-started processes requesting respective rejoins, or as a result of an expiration of a timeout period during which a response from the jury indicated in the approved configuration of the DSM was not obtained). In some embodiments, the same type of bootstrapping protocol may be implemented when the DSM is instantiated for the first time, after a failure of all of the nodes of an existing configuration, or after a maintenance period during which all the nodes were taken offline. In some cases, more than one node may decide to initiate the bootstrap protocol at about the same time, without being aware of the fact that several instances of the bootstrapping procedure are being attempted in parallel.

As indicated in element 505, an identifier and a list of proposed members of a new DSM configuration may be determined at the initiator node, and a set of persistent state information pertaining to the bootstrap protocol itself may be stored at local persistent storage. The new DSM's configuration ID may, for example, be obtained from a source that provides monotonically increasing numerical values in some embodiments. In at least some implementations, such a source (which may, for example, be implemented at the DSM configuration repository or some other component of the provider network at which the DSM is implemented) may guarantee that (a) no two requesters for a DSM configuration identifier are provided the same identifier, and (b) given two DSM configuration identifiers, it is always possible to determine which was generated earlier among the two. The identifier for the proposed configuration may be referred to herein as the "proposed DSM ID" or PDSMID.

The proposed members list for the new DSM configuration may be determined using any of a variety of approaches in different embodiments. For example, in one embodiment, the initiator node may determine the minimum number of nodes that have to be included in the DSM, e.g., by consulting its own local persistent storage at which information regarding the previous normal-mode configuration of the DSM may have been stored, or by consulting the DSM configuration repository. The DSM's configuration repository (or the locally saved configuration information) may also indicate the host list comprising all the possible hosts at which the DSM's nodes may be instantiated, and the network ports used by the nodes for communication. From the comprehensive host list and port information, the required number of host-port combinations for the proposed configuration may be selected at random in some implementations. For example, if the required minimum node count is 9, the initiator may select 8 other nodes (since the initiator expects to be a member of the proposed configuration), e.g., from a comprehensive list of 10 hosts.

In accordance with the bootstrap protocol, at any given time each node may store at least the following metadata elements in its local persistent storage, as shown in FIG. 7: a bootstrap-in-progress DSM configuration identifier (referred to herein as a BIPID), an active DSM configuration identifier (AID), a local last-committed-transition identifier (LCTI), and a local last-accepted-transition identifier (LATI). The BIPID may indicate the configuration that the node is in the process of joining; initially it may be set to zero to indicate that the node is not in the process of joining any configuration. The AID may be set only after a proposed configuration of which the node is a member is approved (i.e., after the bootstrap procedure has completed); initially, the AID may also be set to zero to indicate that there is no such approved configuration. The local LCTI may indicate the latest or most recent state transition (e.g., a write transaction submitted by a client process 305) for which the node has a confirmation of a commit. The local LATI may indicate the latest state transition (e.g., write transaction) known at the node to have been accepted for an eventual commit decision—e.g., a transition for which a client submitted a request, but the request is not known (by the node) to have been resolved yet. The LCTI and the LATI may be referred to collectively as client state transition metadata (or more simply as state transition metadata) herein. In at least some embodiments, the transition identifiers for client state transitions may be implemented as numerical values that increase monotonically over time (e.g., using DSM time values), so if one state transition identifier TI1 is greater than TI2, the state transition corresponding to TI1 may be assumed to have occurred after the state transition corresponding to TI2.

After having determined the proposed members list (PML) and the PDSMID, and initialized the locally-stored bootstrapping protocol state information, the initiator node may construct a bootstrap message (element 507) for propagation among the proposed members. In the depicted embodiment, the bootstrap message may include, for example, the PDSMID, the PML and a joined members list (JML) indicating the nodes that have agreed to join the proposed configuration. In addition, in at least some embodiments the bootstrap message may include an indication of a configuration-wide LCTI and a configuration-wide LATI, indicating the most recent commit and/or acceptance of a state transition for commit analysis among the nodes that have thus far joined the proposed configuration. The initiator node may set the configuration-wide LCTI and LAT values to its local LCTI and LATI values respectively. In at least some embodiments in which multiple instances of the bootstrap protocol may be started up by different initiators, an overrides list may also be included in the bootstrap message and initially set to null. The overrides list may be used to indicate configurations that are overridden by the proposed configuration indicated in the bootstrap message (e.g., because the overridden configurations were proposed later than the PDSMID included in the message), as described below in further detail.

A target destination node may be selected for the bootstrap message (element 510), e.g., by selecting one of the nodes at random from the proposed members list. It is noted that in at least some embodiments, a destination for the message may comprise a host-port combination; that is, the sender of the bootstrap message may not need to know the process incarnation/instantiation information of the recipient. The initial bootstrap message may be sent to the selected destination (element 513), for consideration and propagation among the other PML members. Each node of the PML may eventually receive a respective version of the bootstrap message, make one or more modifications based on the receiving node's local bootstrapping state (as described below in detail with respect to FIGS. 7a and 7b), and propagate the modified version further if there are still members of the PML that have not joined. Eventually, for at least one proposed configuration identified by an initiator, a sufficient number of members of the PML may join that the proposed configuration becomes an approved configuration. Thus, the initiator node itself may eventually receive a bootstrap message (either one that is a modified version of the initial bootstrap message generated locally, or one that is derived from another initiator's initial bootstrap message) (element 516). If the received bootstrap message doesn't indicate that all the PML members have joined, the initiator node may modify the received bootstrap message and transmit the modified version on to another node of the PML. Otherwise, the bootstrap procedure may be deemed complete, and in some embodiments the election procedure for the primus and/or the jury members may begin. In at least some embodiment, it may be the case that the approval of a proposed configuration does not occur within a particular timeout interval (which may also be indicated in the bootstrap message in some implementations), in which case the bootstrapping protocol may be re-started, e.g., by the node that discovers that the timeout has expired.

Figure 6:
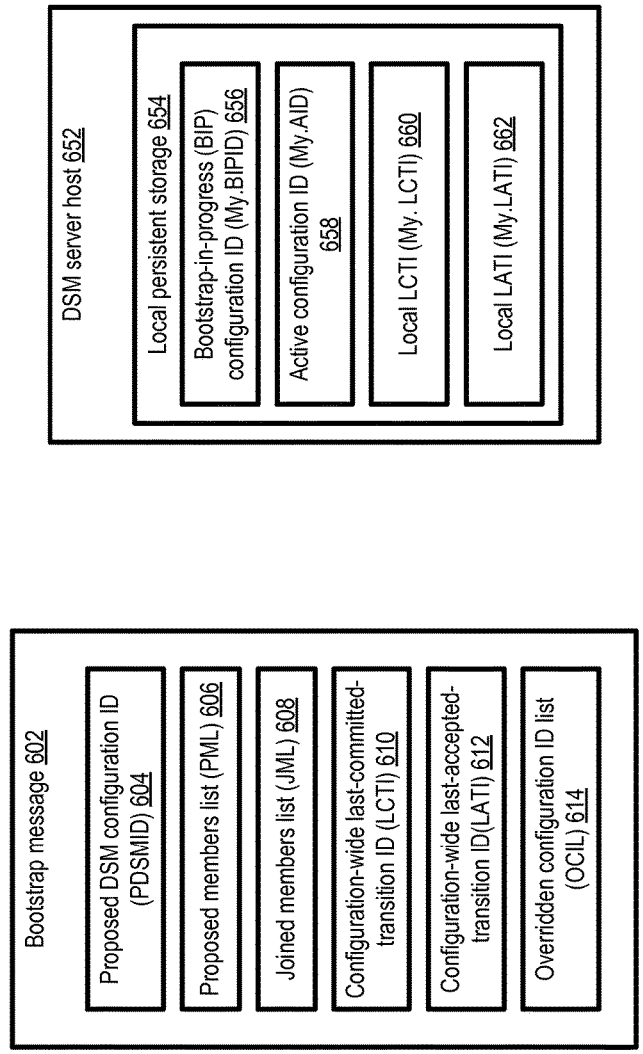
FIG. 6 illustrates example components of a bootstrap message that may be transmitted as part of the DSM bootstrap protocol, according to at least some embodiments.

FIG. 6 illustrates example components of a bootstrap message 602 that may be transmitted as part of the DSM bootstrap protocol, according to at least some embodiments. As shown, the bootstrap message may include the PDSMID 604, a unique identifier assigned to a proposed DSM configuration, a proposed members list (PML) 606 indicating the nodes that the initiator has identified as candidates for the proposed configuration, and a joined members list (JML) 608 indicating those members of the PML that have received versions of the bootstrap message thus far (or, in the case of the initiator, created the message) and agreed to join the proposed configuration. In some embodiments, the JML may include the process instantiation information of the kind illustrated in FIG. 2. In at least some implementations, the PML elements need not necessarily include the process instantiation information, and may simply include the DSM host name and port information of the proposed members.

In the embodiment depicted in FIG. 6, a bootstrap message may also include a configuration wide LCTI 610 and a configuration-wide LATI 612, indicating the most recent commit or acceptance of a state transition known among the members of the JML 608. The configuration-wide LCTI 610 may be set initially to the local LCTI 660 stored at the initiator node's persistent local storage, and similarly, the configuration-wide LATI may be set initially to the local LATI of the initiator. As the bootstrap message is propagated among the PML members, a node that joins the JML may check whether it has a more recent local LATI or local LCTI, and may update the configuration-wide versions of those elements in its outgoing bootstrap message. The overridden configuration ID list (OCIL) 614 may indicate any proposed configurations that have been superseded by the PDSMID (e.g., because they were proposed subsequent to the configuration identified by the PDSMID) as the bootstrap message is propagated among the PML nodes. For example, if the BIPID B1 at a node that receives the bootstrap message is of a more recently-generated DSM configuration than the PDSMID, B1 may be added to the overridden configuration ID list as described below. An optional timeout value may be included in a bootstrap message in some embodiments, e.g., expressed in terms of a logical timestamp or in a number of hops that the message has traversed, and may be used to abandon the current bootstrapping procedure and start a new one.

FIG. 6 also illustrates example elements of bootstrap protocol state information that may be stored locally by at least some DSM nodes. As shown, at least the following state information entries pertaining to bootstrap protocol state may be stored within the local persistent storage 654 of a DSM server host 652 at which a DSM node runs: (a) a bootstrap-in-progress configuration identifier (My.BIPID) 656 indicating a proposed (but not necessarily approved) configuration that the node has joined (initially set to zero or null), (b) an active configuration identifier (My.AID) 658 indicating an approved configuration that the node has joined (also initially set to zero or null), (c) a local LCTI (My.LCTI) 660 indicating the most recent committed state transition known at the node, and (d) a local LATI (My.LATI) 662 indicating the most recent accepted (but not yet committed/aborted) state transition known at the node. The "My" prefix is used to indicate that these state variables are local to the node—e.g., different nodes may have different values for My.BIPID, My.AID, etc. at any given point in time. These persistent state information elements may be used to determine responses to received bootstrap messages as described below.

Figure 7A:
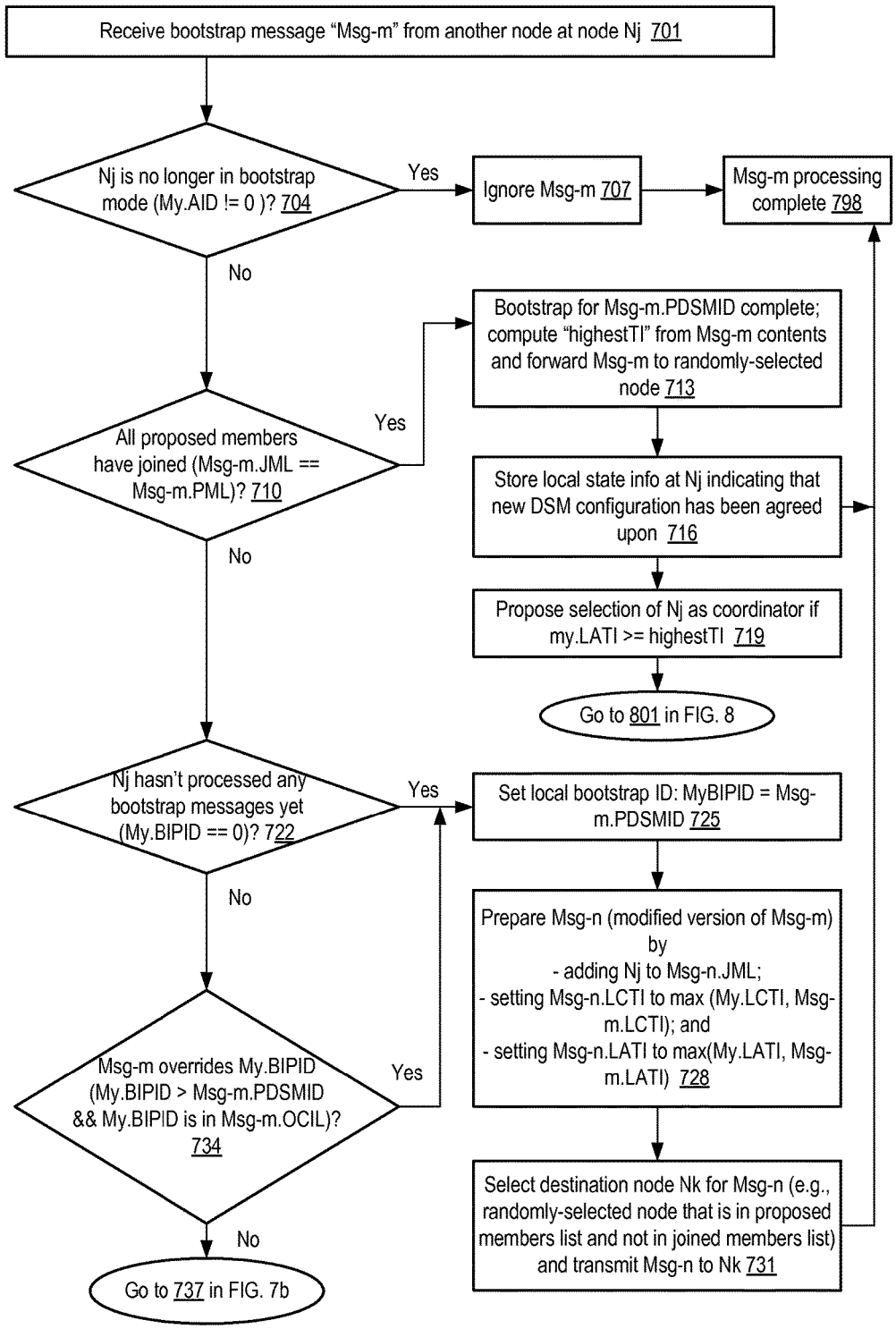
FIGS. 7a and 7b collectively illustrate example responses to bootstrap messages received at DSM nodes participating in the bootstrap protocol, according to at least some embodiments.
Figure 7B:
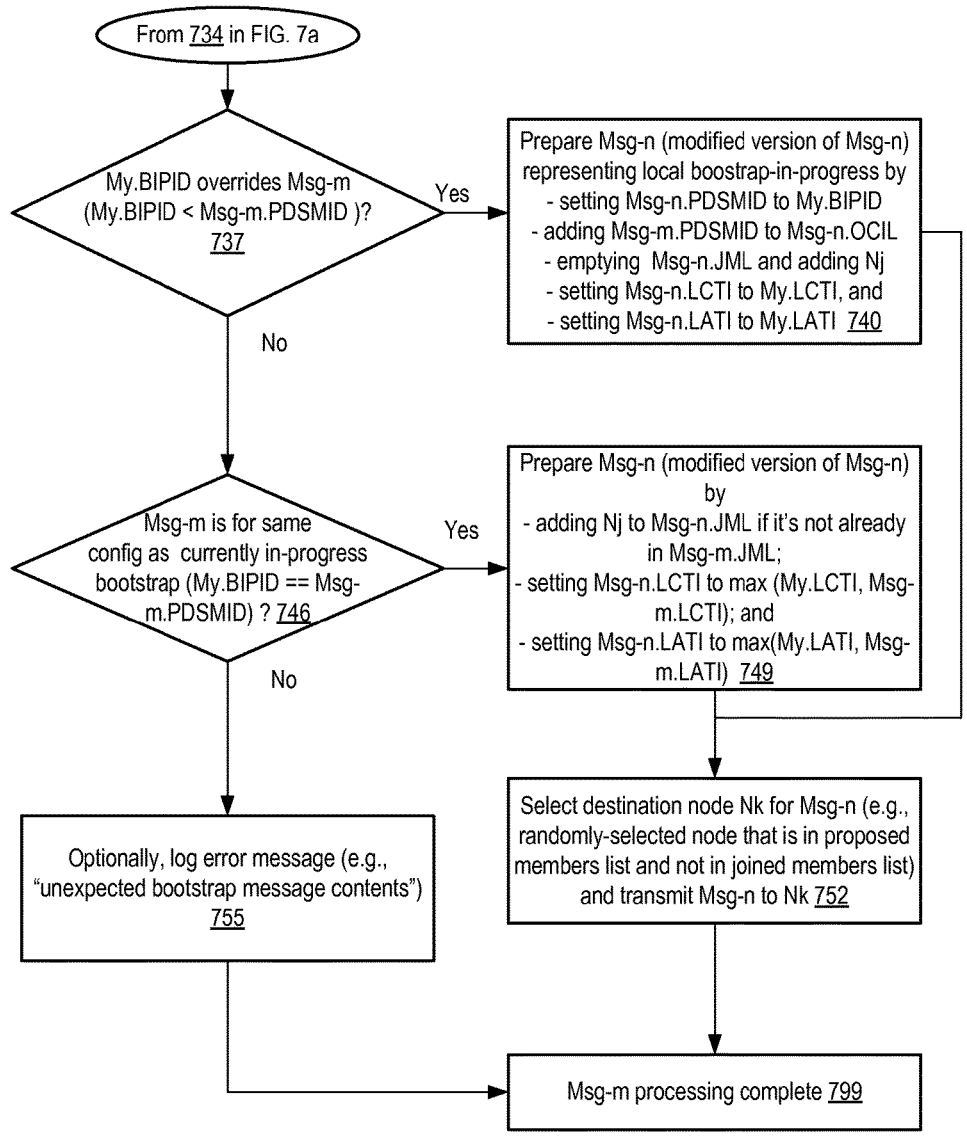

FIGS. 7*a* and 7*b* collectively illustrate example responses to bootstrap messages received at DSM nodes participating in the bootstrap protocol, according to at least some embodiments. As mentioned earlier, in at least some embodiments an initiator node of the DSM may start implementation of the bootstrap protocol by generating a first bootstrap message and sending it to another node that is part of the proposed members list (PML) of the proposed configuration, with the general objective of propagating the message among the PML members and getting the PML members to join the proposed configuration. In the context of FIGS. 7*a* and 7*b*, it is assumed that the bootstrap message comprises the various constituent elements shown in FIG. 6 (e.g., PDSMID etc.), and that each node stores local state information elements shown in FIG. 6 (e.g., My.BIPID etc.) pertaining to the bootstrap protocol.

As shown in element 701 of FIG. 7*a*, a node Nj of the DSM may receive a bootstrap message Msg-m from some other node. If Nj has already joined an approved configuration, which may be the case if Nj's My.AID value is not zero (as detected in element 704), the incoming message may be ignored (element 707) and the processing of Msg-m may be considered complete (element 798) in the depicted embodiment. The condition checked in element 704 may be reached if, for example, Msg-m gets delayed for some time due to network problems or the like.

If Nj is not yet part of an approved configuration, the conditions indicated in elements 710, 722, 734, 737 (in FIG. 7*b*) and 746 (in FIG. 7*b*) may be checked in some selected order, and the corresponding actions may be performed if any of the conditions are met. That is, the order in which the condition checks are illustrated in FIGS. 7*a* and 7*b* need not correspond to the order in which the checks are performed in any given implementation.

In element 710, Nj may check whether all the members of the proposed members list have joined the proposed configuration (e.g., Msg-m.JML contains all the members of Msg-m.PML). If all the PML members have joined, the bootstrap procedure for the configuration identified by Msg-m.PDSMID may be considered complete (element 713). A new local state variable "highestTID", to be used later for determining whether node Nj should propose itself as the primus or coordinator, may be computed from Msg-m contents. For example, consider a scenario in which the maximum number of nodes that could have joined the configuration is X (e.g., 9), while the minimum number of nodes that could have been included in Msg-m.PML by the initiator is Y (e.g., 8), such that Y<X. As mentioned earlier, the length of Msg-m.PML may be any value between X and Y (including X or Y). In some embodiments, if the length of Msg-m.JML (which also equals Msg-m.PML) when operations corresponding to element 710 are performed is less than X, highestTID may be set to Msg-m.LATI (indicating that there may have been some accepted client state transitions, prior to the bootstrap, that could have been committed at one of the nodes that has not joined the configuration). If the length of Msg-m.JML is equal to X, highestTID may be set to Msg-m.LCTI (indicating that all client state transitions that have occurred prior to bootstrap are known by the members that have joined, since there are no other nodes remaining that could have joined). In addition to computing highestTI, Nj may also forward Msg-m without modification to some other node of the configuration in operations corresponding to element 710. Local state information may be stored at Nj, indicating that the new DSM configuration corresponding to Msg-m.PDSMID has been approved, but that the coordinator/primus has not yet been selected (element 714). If node Nj's My.LATI value is no smaller than highestTI, Nj may propose itself for the role of coordinator or primus (element 719) and the operations shown in element 801 onwards of FIG. 8 may subsequently be performed. The process of approving the coordinator or primus may be performed by consensus among the nodes of the configuration, e.g., using a protocol that is independent of the bootstrap protocol itself.

If the JML members of Msg-m do not match the PML members (as also detected in element 710), Nj may check whether it (Nj) has joined any proposed configuration yet, e.g., by checking whether Nj's My.BIPID has been modified from its initial value of zero or null (element 722). If Nj hasn't joined any proposed configuration, e.g., if Msg-m is the first bootstrap message it sees, Nj may join the configuration indicated in Msg-m my setting its local bootstrap-in-progress identifier to Msg-m.PDSMID (element 725). In addition, in the depicted embodiment, Nj may prepare Msg-n, a modified version of Msg-m (element 728) by modifying one or more of Msg-m's elements. Nj may be added (e.g., using a "union" operation for sets) to existing members of Msg-m's JML, for example, to obtain Msg-n's JML. In addition, Msg-n's LATI value may be set to the maximum value among Msg-m's LATI and Nj's local My.LATI. Similarly, Msg-n's LCTI may also be modified to equal Nj's My.LCTI if the My.LCTI value is higher. Such modifications to the LATI and/or LCTI may represent the accumulation of information regarding known state transitions among the JML members—e.g., as more and more nodes join the proposed configuration, the contents of the LATI and LCTI in the corresponding bootstrap messages transmitted may represent the most recent state transition commits/acceptances among the joined members. A destination node Nk may be selected for Msg-n (element 731), e.g., a node selected at random from among those nodes of Msg-n's PML that are not yet members of Msg-n's JML (if any such nodes exist). If, as a result of Nj's addition to Msg-n's JML, all the members of Msg-n's PML are members of Msg-n's JML, Nk may be selected at random from Msg-N's JML in some embodiments. The modified version Msg-n of the received message Msg-m may then be sent to the selected destination Nk to complete the processing of Msg-m at Nj (element 798).

It may be the case in at least some embodiments that Nj may have joined a different proposed configuration by the time it receives Msg-m. For example if Msg-m was generated after a particular initiator node N1 generated Msg-m.PDSMID, some other initiator may have generated a different proposed configuration PDSMID2 and started propagation of bootstrap messaged for PDSMID2. In the depicted embodiment, the proposed DSM identifiers may be assumed to comprise monotonically increasing numerical values, and proposed configurations with smaller (older) identifiers may be assumed to supersede or override proposed configurations with larger (newer) identifiers. If the condition checked in element 722 is not met, and Nj determines that Msg-m overrides the proposed configuration that Nj has previously joined, Nj may modify its local My.BIPID to the PDSMID of Msg-m and perform similar operations to those it would have performed had Nj not yet joined any configuration. As shown in element 734, if Nj's My.BIPID is larger (more recently generated) than Msg-m's PDSMID, and if Nj's My.BIPID is already in the overridden configuration identifier list (OCIL) of Msg-m, the operations corresponding to elements 725, 728 and 731 may be performed.

If, in contrast, Nj determines that its bootstrap-in-progress configuration overrides or supersedes that of Msg-m, e.g., if My.BIPID is smaller (less recently generated) than Msg-m.PDSMID (as detected in element 737 of FIG. 7b), Nj may make a different set of modifications to Msg-m to generate Msg-n. As shown in element 740, Msg-n's PDSMID may be set to Nj's My.BIPID, Msg-m's PDSMID may be added to the list of overridden configurations, and Msg-n's JML may be set to include only Nj. In addition, Msg-n's LATI and LCTI values may be set to the local LATI and LCTI values of Nj. Thus, in effect, upon determining that a received bootstrap message's proposed configuration should be superseded by the configuration that the recipient has already joined, operations very similar to those performed by an initiator when it starts off a bootstrap protocol message propagation may be performed (with one difference being that the overridden configuration list is modified). A destination node Nk may be selected for Msg-n (element 752) using logic similar to that illustrated in element 731, and Msg-n may be sent to Nk to complete the processing of Msg-m (element 799).

If Msg-m is for the same proposed configuration of which Nj is a member (e.g., if Msg-m's PDSMID matches the My.BIPID of Nj as detected in element 746), Msg-n may be generated by adding Nj to Msg-m's JML if Nj was not already a member (element 749), and Nj's LATI and LCTI values may be adjusted in a manner similar to that illustrated in element 728. A destination node Nk may be selected (element 752) and Nk may be transmitted thereto. If none of the conditions checked in elements 704, 710, 722, 734, 737 or 746 are met, in some embodiments an error message may optionally be logged to indicate that an unexpected bootstrap message was received (element 755).

Figure 8:
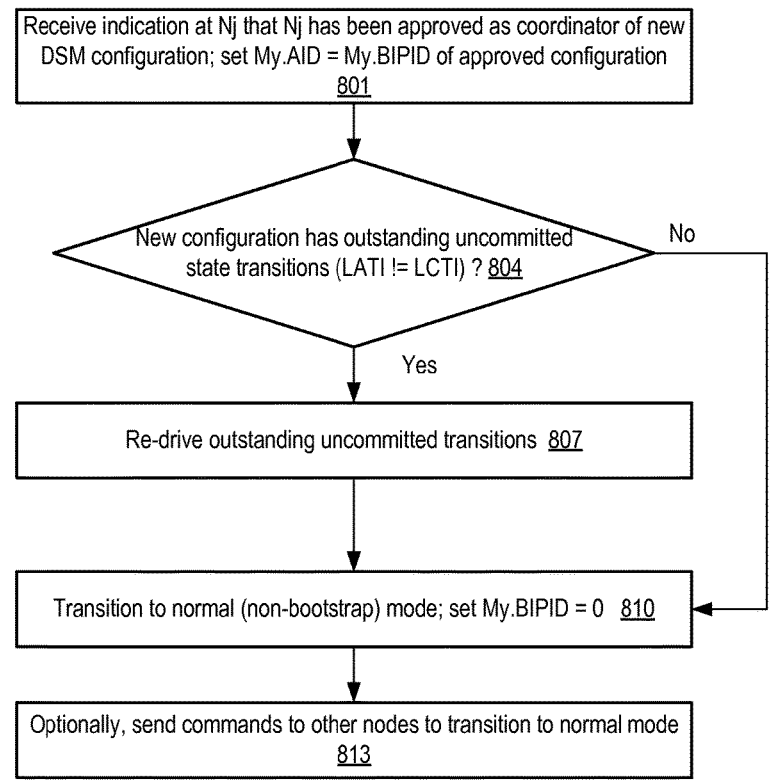
FIG. 8 is a flow diagram illustrating aspects of operations that may be performed after a particular node of a DSM is approved as a coordinator, according to at least some embodiments.

As indicated in element 719 of FIG. 7a, after the bootstrap of a particular proposed configuration is completed, one or more of the nodes may propose themselves as the new primus or coordinator of the re-configured DSM, and one such node may be elected as coordinator by consensus or by majority vote among the other nodes. FIG. 8 is a flow diagram illustrating aspects of operations that may be performed after a particular node of a DSM is approved as a coordinator, according to at least some embodiments. As shown in element 801, any of the nodes that proposed themselves as coordinators, such as node Nj, may receive an indication that it (Nj) has been selected as the coordinator. Nj may set its accepted configuration identifier (My.AID) to the bootstrap-in-progress identifier (My.BIPID). In some embodiments the coordinator may also appoint jury members (or coordinate the election of jury members) at this stage.

If there had been a previous normal-mode configuration of the DSM (e.g., prior to a detection of a hung jury), some client state transitions may have been accepted for a commit decision, but the decision as to whether they should be committed or not may not have been completed, or the results of such a decision may not have reached the nodes that are part of the new configuration. If there are any such outstanding decisions to be made (which may be the case of the configuration-wide LATI value of the new configuration differs from the configuration-wide LCTI), as detected in element 804 of FIG. 8, the newly-elected coordinator may re-drive the outstanding uncommitted transitions (element 807), e.g., by obtaining commit/abort decisions for the uncommitted transitions from the jury members of the new configuration. After completing the commit/abort decisions (if any are required), node Nj may reset its bootstrap-in-progress identifier My.BIPID to zero, indicating that Nj is now in normal mode (element 810). Optionally, commands or requests may be sent to other nodes to set themselves in normal mode as well (element 813), e.g., by similarly re-setting their My.BIPID values.

It is noted that in various embodiments, operations other than those illustrated in the flow diagram of FIGS. 5, 7*a*, 7*b* and 8 may be used to implement at least some of the techniques of bootstrapping distributed state managers. Some of the operations shown may not be implemented in some embodiments, may be implemented in a different order, or in parallel rather than sequentially.

Use Cases

The techniques described above, of detecting (without manual intervention) when a distributed state manager needs to be re-initialized or bootstrapped may be useful in a variety of scenarios. As more and more distributed applications are migrated to provider network environments, the need for distributed state management has been increasing. Many mission critical client applications may rely on provider network services (such as storage services, computing services and the like) whose own state is managed using DSMs. Rapid detection of hung juries and other types of failures, followed by quick initialization of new configurations may be essential to provide the types of service levels expected by customers for their client applications.

Illustrative Computer System

Figure 9:
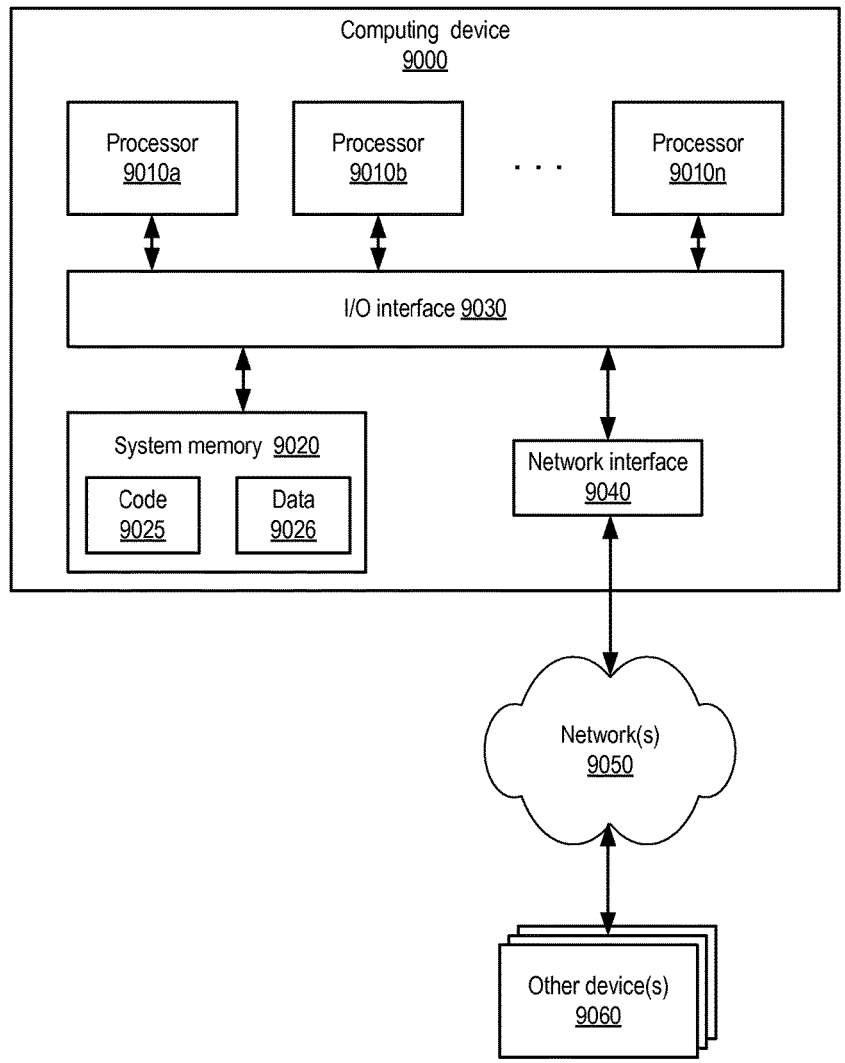
FIG. 9 is a block diagram illustrating an example computing device that may be used in at least some embodiments.

In at least some embodiments, a server that implements one or more of nodes of a DSM or associated administrative components such as a DSM configuration repository may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising a plurality of nodes of a distributed state manager (DSM) configured to commit state transitions of one or more applications using a consensus-based protocol;
    wherein a first node of the plurality of nodes, instantiated at a first computing device, is configured to:
        detect a triggering condition for an initiation of a DSM initialization protocol;
        determine a proposed members list comprising at least a selected number of nodes of the plurality of nodes;
        generate a first bootstrap message indicating at least (a) a joined members list indicating that the first node has accepted membership in a first proposed DSM configuration, (b) a last-committed transition identifier (LCTI) indicating a state transition that has been committed, and (c) a last-accepted transition identifier (LATI) indicating a requested state transition for which commit processing has at least begun; and
        transmit the first bootstrap message to a selected node of the proposed members list for propagation at least to one or more other nodes of the proposed members list, wherein the selected node is instantiated at a different computing device; and
        in response to a detection that a size of a joined members list indicated in a different bootstrap message received from a different node of the proposed members list is above a threshold, wherein the different bootstrap message includes an indication of a particular DSM configuration,
            propose a selection of the first node as a coordinator node of the particular DSM configuration based at least in part on an analysis of one or more of: (a) an LCTI indicated in the different bootstrap message, or (b) an LATI indicated in the different bootstrap message; and
            subsequent to an approval of the first node as the coordinator node, transmit an indication to at least the selected node to begin processing of client-submitted state transition requests.

2. The system as recited in claim 1, wherein to detect the triggering condition, the first node determines that at least a first subset of nodes of the plurality of nodes have restarted subsequent to a selection of a jury comprising a second subset of nodes of the plurality of nodes, wherein the jury was selected to approve client-requested state transitions.

3. The system as recited in claim 2, wherein to determine that at least a first subset of nodes of the plurality of nodes have restarted, the first node determines that a current process instantiation indicator of a particular node of the first subset of nodes differs from a previously-stored process instantiation indicator corresponding to the particular node.

4. The system as recited in claim 1, wherein the selected node is configured to:
    in response to (a) receiving the first bootstrap message and (b) determining that the selected node has not yet accepted membership in another DSM configuration,
        store, in persistent storage of the selected node, a join-in-progress indicator comprising an identifier of the first proposed DSM configuration;
    generate a modified version of the first bootstrap message, wherein a joined members list of the modified version includes an identifier of the selected node;
    determine, based at least in part on state transition records stored at the selected node, whether to update one or more of the LCTI or the LATI of the first bootstrap message for inclusion in the modified version; and
    transmit the modified version to a third node selected from the plurality of nodes.

5. The system as recited in claim 1, wherein a size of the proposed members list is based at least in part on a minimum jury size associated with committing state transitions at the DSM.

6. A method, comprising:
    performing, by a particular node of a plurality of nodes of a distributed state manager (DSM) responsible for processing state transitions of one or more applications:
        detecting a triggering condition for an initiation of a DSM initialization protocol;
        identifying a proposed members list comprising at least a selected number of nodes of the plurality of nodes;
        transmitting a first bootstrap message to a second node of the proposed members list, wherein the first bootstrap message comprises at least (a) a joined members list indicating that the particular node has accepted membership in a first proposed DSM configuration, (b) state transition metadata indicative of one or more state transitions for which processing of respective commit requests has been at least initiated at the particular node; and in response to determining that an initialization protocol for a particular DSM configuration indicated in a different bootstrap message received at the particular node has been completed, proposing, based at least in part on an analysis of state transition metadata indicated in the different bootstrap message, a selection of the particular node as a coordinator node of the particular DSM configuration.

7. The method as recited in claim 6, wherein said detecting the triggering condition comprises determining that at least a first subset of nodes of the plurality of nodes have restarted subsequent to a selection of a jury comprising a second subset of nodes of the plurality of nodes, wherein the jury was selected to approve client-requested state transitions.

8. The method as recited in claim 7, wherein said determining that at least a first subset of nodes of the plurality of nodes have restarted comprises determining that a current process instantiation indicator of a first node of the first subset of nodes differs from a previously-stored process instantiation indicator corresponding to the first node.

9. The method as recited in claim 7, further comprising performing, by the particular node:

storing, in persistent storage of the particular node prior to transmitting the first bootstrap message, one or more of: (a) a join-in-progress indicator comprising an identifier of the first proposed DSM configuration (b) a last-committed transition identifier (LCTI) indicating a state transition that has been committed, (c) a last-accepted transition identifier (LATI) indicating a requested state transition for which commit processing has at least begun.

10. The method as recited in claim 9, wherein said state transition metadata comprises one or more of: the LCTI or the LATI.

11. The method as recited in claim 6, further comprising performing, by the second node:

in response to (a) receiving the first bootstrap message and (b) determining that the second node has not yet accepted membership in another DSM configuration, storing, in persistent storage of the second node, a join-in-progress indicator comprising an identifier of the first proposed DSM configuration;

generating a modified version of the first bootstrap message, wherein a joined members list of the modified version includes an identifier of the second node;

determining, based at least in part on state transition records stored at the second node, whether to update one or more elements of state transition metadata of the modified version; and transmitting the modified version to a third node selected from the plurality of nodes.

12. The method as recited in claim 6, further comprising performing, by the second node:

in response to receiving a second bootstrap message indicating the first proposed DSM configuration, determining, based at least in part on state transition records stored at the second node, whether one or more elements of state transition metadata of the second bootstrap message are to be updated; and transmitting a version of the second bootstrap message to a third node selected from the plurality of nodes.

13. The method as recited in claim 6, further comprising performing, by the second node:

in response to receiving a second bootstrap message indicating a second proposed DSM configuration, wherein the second proposed DSM configuration supersedes the first DSM configuration, storing, in persistent storage of the second node, a join-in-progress indicator comprising an identifier of the second proposed DSM configuration, generating a modified version of the second bootstrap message, wherein a joined members list of the modified version includes an identifier of the second node;

determining, based at least in part on state transition records stored at the second node, whether one or more elements of state transition metadata of the modified version are to be updated; and transmitting the modified version to a third node selected from the plurality of nodes.

14. The method as recited in claim 6, further comprising performing, by the second node:

in response to receiving a second bootstrap message indicating a second proposed DSM configuration, wherein the first proposed DSM configuration supersedes the second DSM configuration, generating a modified version of the second bootstrap message indicating the first proposed DSM configuration, wherein a superseded list of the second bootstrap message indicates the second proposed DSM configuration, wherein a joined members list of the modified version includes an identifier of the second node;

determining, based at least in part on state transition records stored at the second node, whether one or more elements of state transition metadata of the modified version are to be updated; and transmitting the modified version to a third node selected from the plurality of nodes.

15. The method as recited in claim 6, further comprising performing, by the particular node:

subsequent to an approval of the particular node as the coordinator node, transmitting an indication to at least the second node to begin processing of client-submitted state transition requests.

16. A non-transitory computer-accessible storage medium storing program instructions that when executed on one or more processors implement a particular node of a plurality of nodes of a distributed state manager (DSM), wherein the particular node is configured to:

detect a triggering condition for an initiation of a DSM initialization protocol;

transmit a first bootstrap message to a second node of a proposed members list of a first proposed DSM configuration, wherein the first bootstrap message comprises at least (a) a joined members list indicating that the particular node has accepted membership in the first proposed DSM configuration, (b) state transition metadata indicative of one or more state transitions for which processing of respective commit requests has been at least initiated at the particular node; and in response to a determination that an initialization protocol for a particular DSM configuration indicated in a different bootstrap message received at the particular node has been completed, propose, based at least in part on an analysis of state transition metadata indicated in the different bootstrap message, a selection of the particular node as a coordinator node of the particular DSM configuration.

17. The non-transitory computer-accessible storage medium as recited in claim 16, wherein to detect the triggering condition, the particular node is configured to determine that at least a first subset of nodes of the plurality of nodes have restarted subsequent to a selection of a jury comprising a second subset of nodes of the plurality of nodes, wherein the jury was selected to approve client-requested state transitions.

18. The non-transitory computer-accessible storage medium as recited in claim 17, wherein to determine that at least a first subset of nodes of the plurality of nodes have restarted, the particular node is configured to determine that a current process instantiation indicator of a first node of the first subset of nodes differs from a previously-stored process instantiation indicator corresponding to the first node.

19. The non-transitory computer-accessible storage medium as recited in claim 16, wherein the particular node is configured to:
    store, in persistent storage of the particular node prior to transmitting the first bootstrap message, one or more of: (a) a join-in-progress indicator comprising an identifier of the first proposed DSM configuration (b) a last-committed transition identifier (LCTI) indicating a state transition that has been committed, (c) a last-accepted transition identifier (LATI) indicating a requested state transition for which commit processing has at least begun.

20. The non-transitory computer-accessible storage medium as recited in claim 19, wherein said state transition metadata comprises one or more of: the LCTI or the LATI.

* * * * *